Feb. 16, 1943.  K. R. SJOGREN  2,311,258
COLLET CHUCK
Filed Jan. 26, 1942
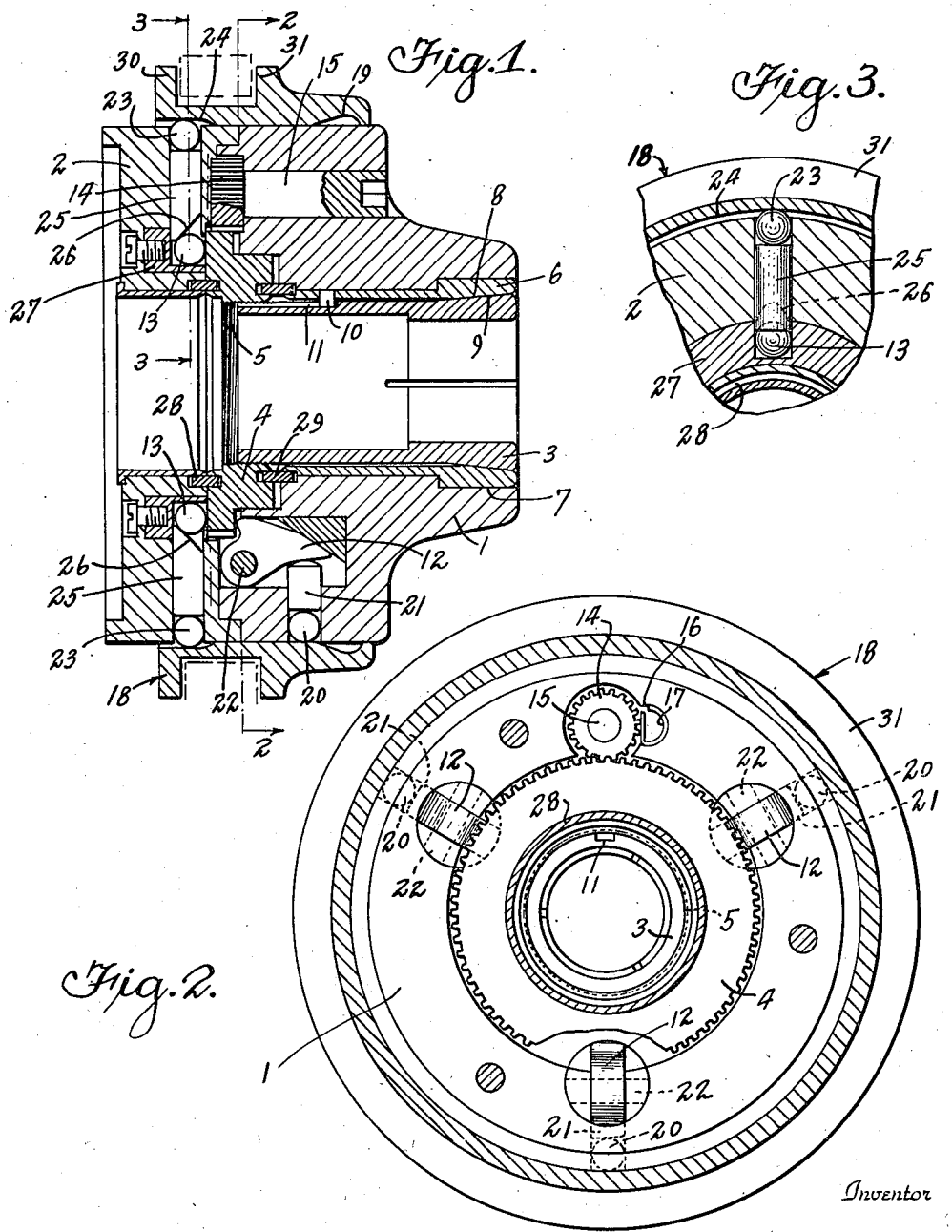
Inventor
Knut R. Sjogren
By Lyon & Lyon
Attorneys Patented Feb. 16, 1943

2,311,258

UNITED STATES PATENT OFFICE 2,311,258

COLLET CHUCK

Knut R. Sjogren, Los Angeles, Calif.

Application January 26, 1942, Serial No. 428,217

6 Claims. (Cl. 279—53)

My invention relates to a collet chuck and more particularly to a collet chuck which is used on lathes, screw machines or similar types of machines to hold the material to be worked.

Various types of collet chucks have been used in the past but all have one or more deficiencies. These deficiencies are that to release or tighten the collet on the work, the machine must be stopped, and in the automatic screw machines no means are provided for releasing and tightening the collet while in motion and also means for adjusting the collet for different diameters of stock material.

It is therefore an object of my invention to provide a collet chuck which may be released or tightened without stopping the lathe or screw machine.

Another object of my invention is to provide a collet chuck which can be adjusted for minor changes in the diameter of the stock material to be used without changing chucks.

Other objects of my invention are to provide a chuck simple in operation and construction.

Other objects will be apparent from the following description and drawing of the preferred embodiment of my invention.

Referring to the drawing:

Fig. 1 is a cross section.

Fig. 2 is a cross section taken on the line 2—2 of Fig. 1.

Fig. 3 is a fragmentary cross section taken on the line 3—3 of Fig. 1.

A collet chuck constructed in accordance with my invention, comprises a body 1 to which is bolted a back plate 2a. The back plate is bolted in the usual way to the spindle of a lathe or screw machine.

To securely maintain an ordinary spring collet 3 I provide a planetary gear 4 having a threaded bore 5 for threadably engaging the collet 3. A face hardened bushing 6 is inserted in the central bore 7 of the body 1 and has a tapered surface 8 upon which the tapered surface 9 of the collet 3 is drawn up when the collet 3 is threaded into the gear 4.

To prevent rotation of the collet 3 I provide a pin 10 mounted in the central bore 7 which engages a slot 11 in the collet 3.

While the gear 4 is slidably and rotatively mounted between the body 1 and the back plate 2, it is prevented from sliding therein by the dogs 12 and the steel balls 13.

To rotate the gear 4 a spur gear 14 is in mesh therewith and is carried on a shaft 15 rotatively carried by the body 1 and has the usual slot at its outer end for the insertion of a wrench to rotate the same. By rotating the shaft 15 the gear 4 is rotated and the collet 3 drawn into or ejected from the gear 4 by the threads 5. When drawn into the gear 4 the tapered surfaces 8 and 9 cooperate to squeeze the segments of the collet together and firmly grip any stock mounted therein.

To prevent rotation of the gears 4 and 14 by possible vibration of the chuck during operations, a bore 16 in the body 1 is provided into which a spring 17 is inserted to engage and press against the teeth of the gear 14 and thus prevent unintentional rotation.

A desirable feature of my invention is the slidably mounted gear 4. It will be noted that once the collet 3 is tightened against stock by threading into the gear 4, that sliding the gear 4 toward the outer face of the body 1 will release the squeeze caused by the tapered surfaces 8 and 9 and stock readily slides in and out of the collet. To accomplish this sliding motion the dogs 12 are released from their engaging position by moving the clutch ring 18 toward the back plate 2. The clutch ring 18 has a tapered recess 19 into which the balls 20 enter allowing the pins 21 to be disengaged from contact from the dogs 12. The dogs 12 are then free to rotate on their pivots 22 and disengage the gear 4. At the same time the balls 23 are forced inwardly by the tapered surface 24 and force the pins 25 inwardly. The pins 25 have bevels 26 on their inward ends against which the balls 13 rest. Forcing the pins 25 inwardly, drives the balls 13 forward and thus forces the gear 4 forward, releasing the collet 3. When it is desired to tighten the collet 3 the clutch ring is moved forward, releasing the train of the balls 23, pins 25, and the balls 13 and permitting the train of the balls 20, pins 21, and dogs 12 to move the gear rearwardly.

As the ball 13 would cause considerable wear on the mild steel of the backing plate, a hardened steel bushing 27 is inserted in the backing plate and bolted in place.

A novel feature of my invention is the means provided to keep metal chips and dirt out of the working parts of the chuck. These means comprise the dirt rings 28 and 29 recessed between the back plate 24, planetary gear 4, and between the planetary gear 4 and the body 1, respectively. These dirt rings 28 and 29 close off the openings between the planetary gear 4 and either the back plate 2 or the body 1, and thus any failure of the chuck because of chips or dirt preventing movement of the planetary gear, is prevented.

Though the clutch ring 18 may be moved by hand, this would not always be safe while the chuck was being rotated, and I therefore prefer to operate it by a lever attached to the lathe or screw machine head, and having dogs which will engage the flanges 30 or 31 on the clutch ring 18. These dogs are free to slide around the clutch ring. As any suitable system well known in the trade can be used, I have not illustrated this mechanism.

In the operation of my chuck, the stock is inserted in the collet 3 while the clutch ring 18 is in a forward position, and the collet is then tightened to the required grip on the stock by rotation of the planetary gear 4 by means of a wrench turning shaft 15. The movement of the clutch ring 18 rearwardly releases the stock and permits a new portion to be drawn out for work. The movement of the clutch ring 18 forwardly will then cause the collet 3 to grip the stock without the loss of time necessary in stopping and starting the machine.

One of the chief features of my invention lies in the adjustability of the collet to take different sizes of material without changing collets. In the present automatic chucks there is no provision such as the slidable and rotatable planetary gear for engaging a collet which can be finely adjusted to the particular stock and still permit quick disengagement between collet and stock. Of course, large changes of stock require different sizes of collets to be slid into the bushing 6, but small differences do not require specially ground and expensive collets.

While I have described the preferred embodiments of my invention, I am not limited to the details herein described except as set forth in the appended claims.

I claim:

1. In a chuck, a body, a spring collet, a bushing having tapered surfaces into which said collet is drawn to contract said collet, a planetary gear carried by said body and threaded to said spring collet, said planetary gear being slidably and rotatably mounted in said body whereby rotation of said planetary gear will adjust said collet in its position in relation to said bushing, and whereby sliding of said planetary gear draws into or expels said collet from said bushing, means for rotating said planetary gear, dogs operated by pins and balls for sliding said planetary gear in one direction, pins and balls for sliding said planetary gear in the other direction, and a clutch ring surrounding said body having tapered surfaces for respectively releasing or engaging either said dogs, pins and balls, or said pins and balls.

2. In a chuck, a body, a back plate, a spring collet, a bushing having tapered surfaces into which said collet is drawn to contract said collet, a planetary gear carried by said body and threaded to said spring collet, said planetary gear being slidably and rotatably mounted in said body whereby rotation of said planetary gear will adjust said collet in its position in relation to said bushing, and whereby sliding of said planetary gear draws into or expels said collet from said bushing, means for rotating said planetary gear, dogs operated by pins and balls for sliding said planetary gear in one direction, pins and balls for sliding said planetary gear in the other direction, a clutch ring surrounding said body having tapered surfaces for respectively releasing or engaging either said dogs, pins and balls, or said pins and balls, and a hardened bushing for protecting said back plate from said pins and balls.

3. In a chuck, a body, a back plate, a spring collet, a bushing having tapered surfaces into which said collet is drawn to contract said collet, a planetary gear carried by said body and threaded to said spring collet, said planetary gear being slidably and rotatably mounted in said body, whereby rotation of said planetary gear will adjust said collet in its position in relation to said bushing, and whereby sliding of said planetary gear draws into or expels said collet from said bushing, means for rotating said planetary gear, means for preventing accidental rotation of said planetary gear, means for sliding said planetary gear, and dirt rings between said body and said planetary gear and between said planetary gear and said back plate to prevent debris from stopping the sliding or rotation of said planetary gear.

4. In a chuck, a body, a spring collet, a bushing having tapered surfaces into which said collet is drawn to contract said collet, a planetary gear carried by said body and threaded to said spring collet, said planetary gear being slidably and rotatably mounted in said body whereby rotation of said planetary gear will adjust said collet in its position in relation to said bushing, and whereby sliding of said planetary gear draws into or expels said collet from said bushing, a clutch ring, and means connecting said clutch ring and said planetary gear whereby movement of said clutch ring slides said planetary gear and said collet.

5. In a chuck, a body, a back plate, a spring collet, a bushing having tapered surfaces into which said collet is drawn to contract said collet, a planetary gear carried by said body and threaded to said spring collet, said planetary gear being slidably and rotatably mounted in said body whereby rotation of said planetary gear will adjust said collet in its position in relation to said bushing, and whereby sliding of said planetary gear draws into or expels said collet from said bushing, a clutch ring around said body and said back plate and slidable thereon, means connecting said clutch ring and said planetary gear whereby movement of said clutch ring slides said planetary gear and said collet, and dirt rings between said body and said planetary gear and between said planetary gear and said back plate to prevent debris from stopping the sliding of said planetary gear.

6. In a chuck, a body, a back plate, a spring collet, a bushing having tapered surfaces into which said collet is drawn to contract said collet, a planetary gear carried by said body and threaded to said spring collet, said planetary gear being slidably and rotatably mounted in said body whereby rotation of said planetary gear will adjust said collet in its position in relation to said bushing, and whereby sliding of said planetary gear draws into or expels said collet from said bushing, means for rotating said planetary gear, a clutch ring around said body and said back plate and slidable thereon, means connecting said clutch ring and said planetary gear whereby movement of said clutch ring slides said planetary gear and said collet, and dirt rings between said body and said planetary gear and between said planetary gear and said back plate to prevent debris from stopping the sliding and rotation of said planetary gear.

KNUT R. SJOGREN.